(12) United States Patent
Allaire et al.

(10) Patent No.: US 6,207,939 B1
(45) Date of Patent: Mar. 27, 2001

(54) DEVICE AND METHOD FOR DE-ICING AN ELONGATED STRUCTURAL ELEMENT

(75) Inventors: Marc-Andre Allaire, St-Fulgence; Jean-Louis Laforte, Chicoutimi, both of (CA)

(73) Assignee: Hydro-Quebec, Montreal (CA)

( * ) Notice: Subject to any disclaimer, the term of this patent is extended or adjusted under 35 U.S.C. 154(b) by 0 days.

(21) Appl. No.: 09/463,821

(22) PCT Filed: Jul. 21, 1998

(86) PCT No.: PCT/CA98/00707

§ 371 Date: Apr. 6, 2000

§ 102(e) Date: Apr. 6, 2000

(87) PCT Pub. No.: WO99/07050

PCT Pub. Date: Feb. 11, 1999

(30) Foreign Application Priority Data

Aug. 1, 1997 (CA) .................................................. 2211034

(51) Int. Cl.$^7$ ................................ H05B 6/00; H02G 7/16
(52) U.S. Cl. .......................... 219/600; 219/636; 219/679; 174/40 R; 191/33 PM
(58) Field of Search ..................................... 219/600, 635, 219/636, 678, 679, 687; 244/134 R, 134 D; 174/40 R, 1; 191/33 PM

(56) References Cited

U.S. PATENT DOCUMENTS

| 2,870,311 | 1/1959 | Greenfield et al. | 219/19 |
|---|---|---|---|
| 3,316,344 | 4/1967 | Kidd et al. | 174/106 |
| 3,316,345 | 4/1967 | Toms et al. | 174/126 |
| 3,835,269 | 9/1974 | Levin et al. | 191/62 |
| 4,190,137 | 2/1980 | Shimada et al. | 191/27 |
| 4,212,378 | 7/1980 | Hrovat | 191/62 |
| 4,690,353 | 9/1987 | Haslim et al. | 244/134 |
| 4,875,644 * | 10/1989 | Adams et al. | 244/134 R |
| 5,022,612 | 6/1991 | Berson | 244/134 |
| 5,029,440 | 7/1991 | Graber et al. | 60/39.093 |
| 5,143,325 | 9/1992 | Zieve et al. | 244/134 |
| 5,172,024 | 12/1992 | Broussoux et al. | 310/323 |
| 5,389,766 * | 2/1995 | Takahashi et al. | 219/635 |
| 5,411,121 | 5/1995 | LaForte et al. | 191/33 PM |

FOREIGN PATENT DOCUMENTS

| 0 651 487 | 10/1994 | (EP) . |
|---|---|---|
| 2-70539 | 3/1990 | (JP) . |
| 3-11914 | 1/1991 | (JP) . |
| 3-204345 | 9/1991 | (JP) . |
| 4-78727 | 3/1992 | (JP) . |
| 4-281314 | 6/1992 | (JP) . |

OTHER PUBLICATIONS

Robert I. Egbert et al, "IEEE Transactions on Power Delivery" vol. 4, No. 3, *An Investigation of Power Line De-Icing by Electro-Impulse Methods,* pp. 1855–1861, (Jul. 1989).

* cited by examiner

Primary Examiner—Philip H. Leung
(74) Attorney, Agent, or Firm—Foley & Lardner

(57) ABSTRACT

The device and the method are used to de-ice an elongated structural element having a closed contour. The device is formed of pairs of electrically conductive and insulated wires, preformed for winding, one next to the other, along and around the structural element following an helicoidal trajectory while embracing the contour of the structural element with a certain gap. The conductive wires have ends for receiving electromagnetic impulses, and opposite ends electrically connected together. The conductive wires are sized to withstand a current causing a repulsion force whose intensity is capable of breaking the ice or the frost on the structural element by the separation of the conductive wires from each other in response to the repulsion. The conductive wires have rigidity and elasticity properties such that they recover their shape around the structural element after the separation caused by the repulsion.

17 Claims, 5 Drawing Sheets

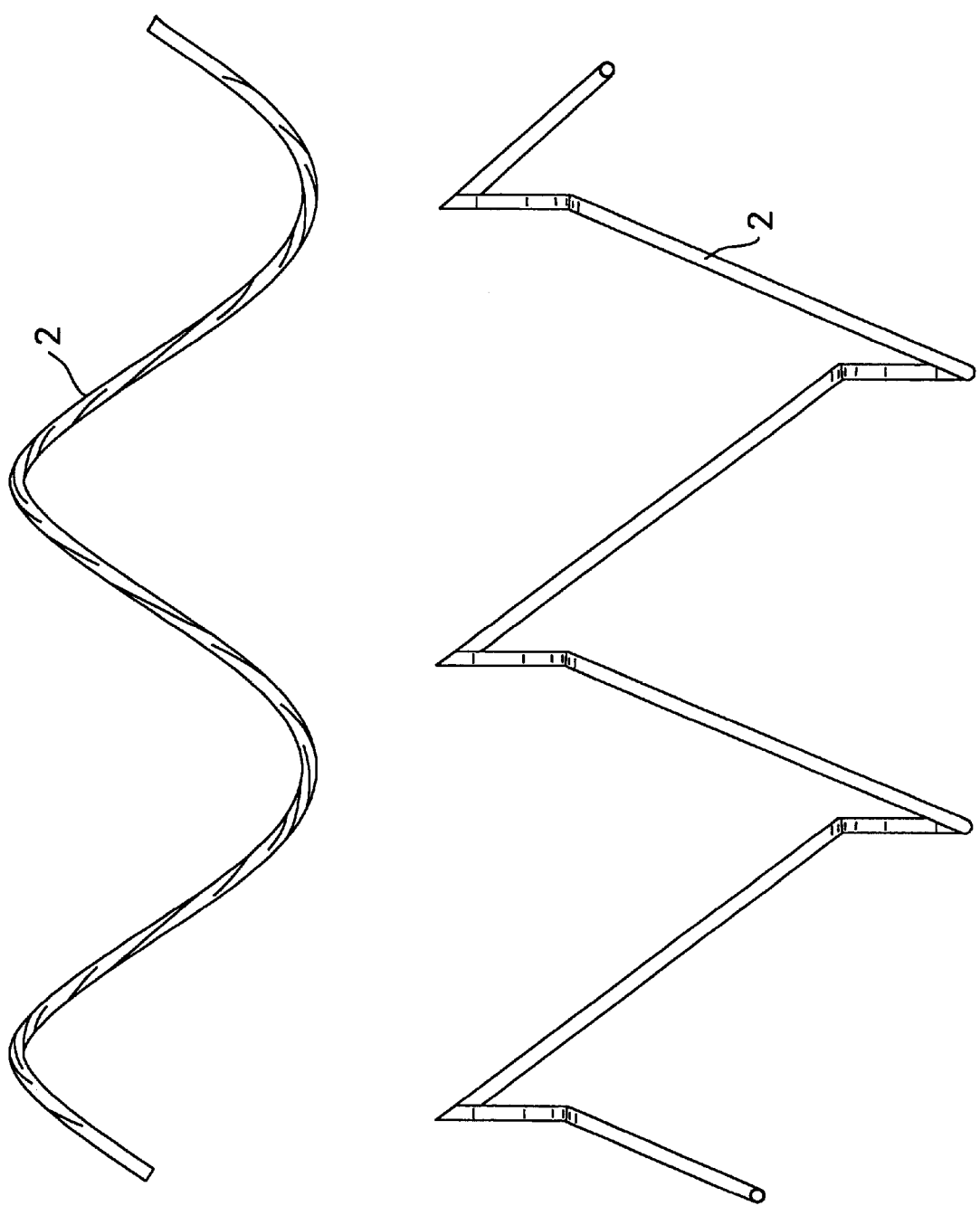

DEVICE AND METHOD FOR DE-ICING AN ELONGATED STRUCTURAL ELEMENT

FIELD OF THE INVENTION

The present invention relates to devices for removing the snow or the ice that can build-up for example on electrical lines or cables, and relates more particularly to a device and a method for de-icing an elongated structural element like a high-voltage electrical line or a guyed tower.

BACKGROUND OF THE INVENTION

In cold regions, the structural tubular elements, no matter the shape that they exhibit, i.e. rectangular, square or circular, are often subjected to atmospheric ice precipitations, like hard frost, black ice and wet snow. The ice accumulation on these elements may cause mechanical overloads that will deform them, even going so far as to sometimes produce disastrous mechanical breakages. So far, there are no methods truly efficient from the energetic and automatized point of view, that are capable of reducing the ice accumulation on these structural elements.

The U.S. Pat. No. 4,690,353 (HASLIM) and the U.S. Pat. No. 5,411,121 (LAFORTE et al.) describe devices or systems using high intensity electromagnetic impulses to break the ice.

In the case of HASLIM, the system is applicable to planar surfaces, and has been developed to remove the ice on the wing of an airplane. Electromagnetic pulses are injected in a thin double ribbon of copper positioned (embedded) in a rubber film.

In the case of LAFORTE et al., the device is applicable to stranded conductors, like a stranded cable. To break the ice, electromagnetic impulses are injected in some of the insulated, integrated conductive wires in the last stranded layer of the cable. These conductive wires are insulated for this purpose during the manufacturing process of the cable.

The publication entitled "An Investigation of Power Line De-icing by Electro-Impulse Methods", published in the paper IEEE Transaction on Power Delivery, Vol. 4, No. 3, July 1989 in the name of EGBERT et al., describes a test with an ACSR conductor coated with rubber bands containing flexible copper strips in which electromagnetic impulses have been injected. In this test, the rubber bands surrounding the conductor had not an appropriate shape and the copper strips, too thin, were not providing a sufficient mechanical resistance to break the ice, so that under the effect of impulses, the coating was deforming instead of breaking the ice, the mechanical resistance of the copper strips being lower than that of the ice. As underlined by the authors as a conclusion of their experimentation, the use of this type of overlapping does not allow to efficiently de-ice the closed surface of a conductor.

SUMMARY OF THE INVENTION

The invention provides a device for de-icing an elongated structural element having a closed contour, comprising: at least one pair of electrically conductive wires preformed for winding, one next to the other, along and around the structural element following a substantially helicoidal trajectory while embracing substantially the contour of the structural element with a predetermined gap between the conductive wires and the structural element, the conductive wires having first ends for receiving electromagnetic impulses, and second ends opposite to the first ends, the conductive wires being sized to withstand a current causing, between the conductive wires of the pair, a repulsion having an intensity capable of breaking the ice or the frost on the structural element by a separation of the conductive wires from each other in response to the repulsion, the conductive wires having rigidity and elasticity properties such that the conductive wires recover their shape around the structural element after the separation caused by the repulsion; means for electrically connecting the second ends of the conductive wires of the pair together; and means for electrically insulating the conductive wires of the pair from each other and from the structural element.

The invention also provides a method for de-icing an elongated structural element having a closed contour, comprising the steps of: positioning at least one pair of conductive wires along the structural element, the conductive wires being preformed for winding, one next to the other, along and around the structural element following a substantially helicoidal trajectory while substantially embracing the contour of the structural element with a predetermined gap between the conductive wires and the structural element, the conductive wires having first and second opposite ends, the conductive wires being provided with means for electrically insulating the conductive wires from each other and from the structural element, the conductive wires being sized to withstand a current causing, between the conductive wires of the pair, a repulsion having an intensity capable of breaking the ice or the frost on the structural element by a separation of the conductive wires from each other in response to the repulsion, the conductive wires having rigidity and elasticity properties such that the conductive wires recover their shape around the structural element after the separation caused by the repulsion; electrically connecting the second ends of the conductive wires together; and applying electromagnetic impulses between the first ends of the conductive wires to generate said current in the conductive wires.

The de-icing device according to the invention is adaptable to any already existing aerial structural element, electric insulator or conductor, whose surface exhibits a closed contour like, for example, the aerial rods and cables of various sections: circular, square, rectangular, etc. The de-icing device is applicable to a conductor of an electrical line under voltage, around which it forms a kind of jacket or sheath. The de-icing method only requires a low level of energy; being of mechanical type, that uses electromagnetic impulses, it requires 100 to 1000 times less energy than thermic type techniques. The de-icing device forms an independent unit as such from the structural element that it covers. Thus, it does not need to be fasten to the structural element. It can be installed on the cables during their industrial manufacturing or on the cables already in place.

BRIEF DESCRIPTION OF THE FIGURES

The invention is further described hereinafter by way of examples, in reference to the following drawings where:

FIGS. 1 and 2 are elevation side views showing two shapes of conductive wires according to the invention;

DETAILED DESCRIPTION OF THE PREFERRED EMBODIMENTS

Referring to FIGS. 1 and 2, there are shown two shapes of preformed wires 2, suitable for the construction of the de-icing device according to the invention. The shape of the wire 2 illustrated in FIG. 1 is suitable to a structural element (not illustrated in the figure) whose external surface forms a circular contour, whereas the shape of the wire 2 illustrated in FIG. 2 is suitable to a structural element (not illustrated in the figure) whose external surface forms a rectangular or square contour. Other shapes of preformed wires can obviously be used so far to be suitable to the contour shape of the structural element.

Figure 3:
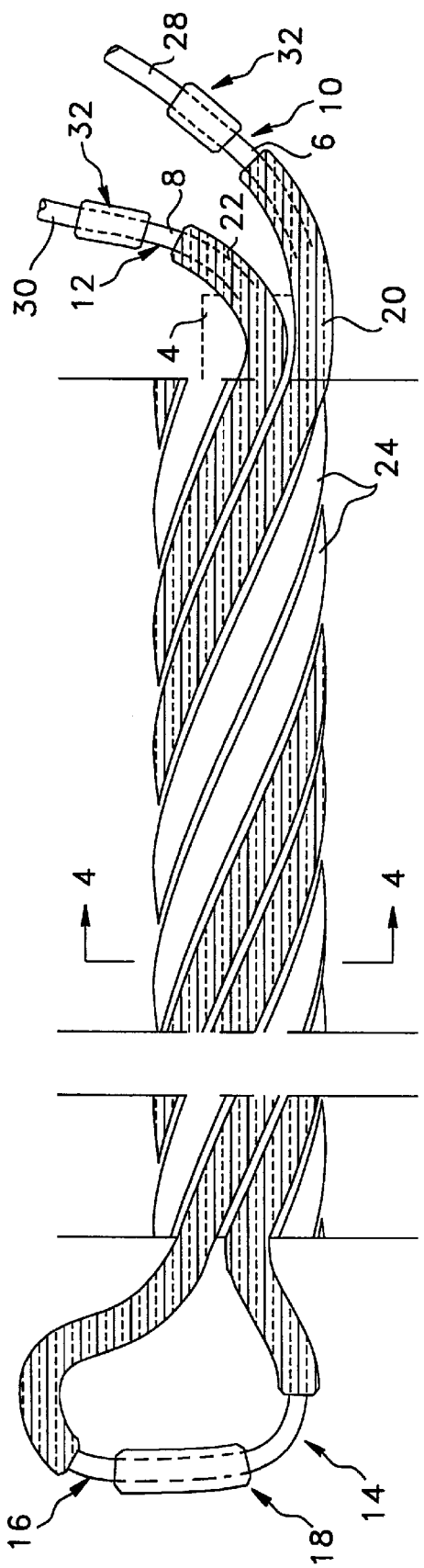
FIG. 3 is a side elevation view of a de-icing device according to the invention.
Figure 4:
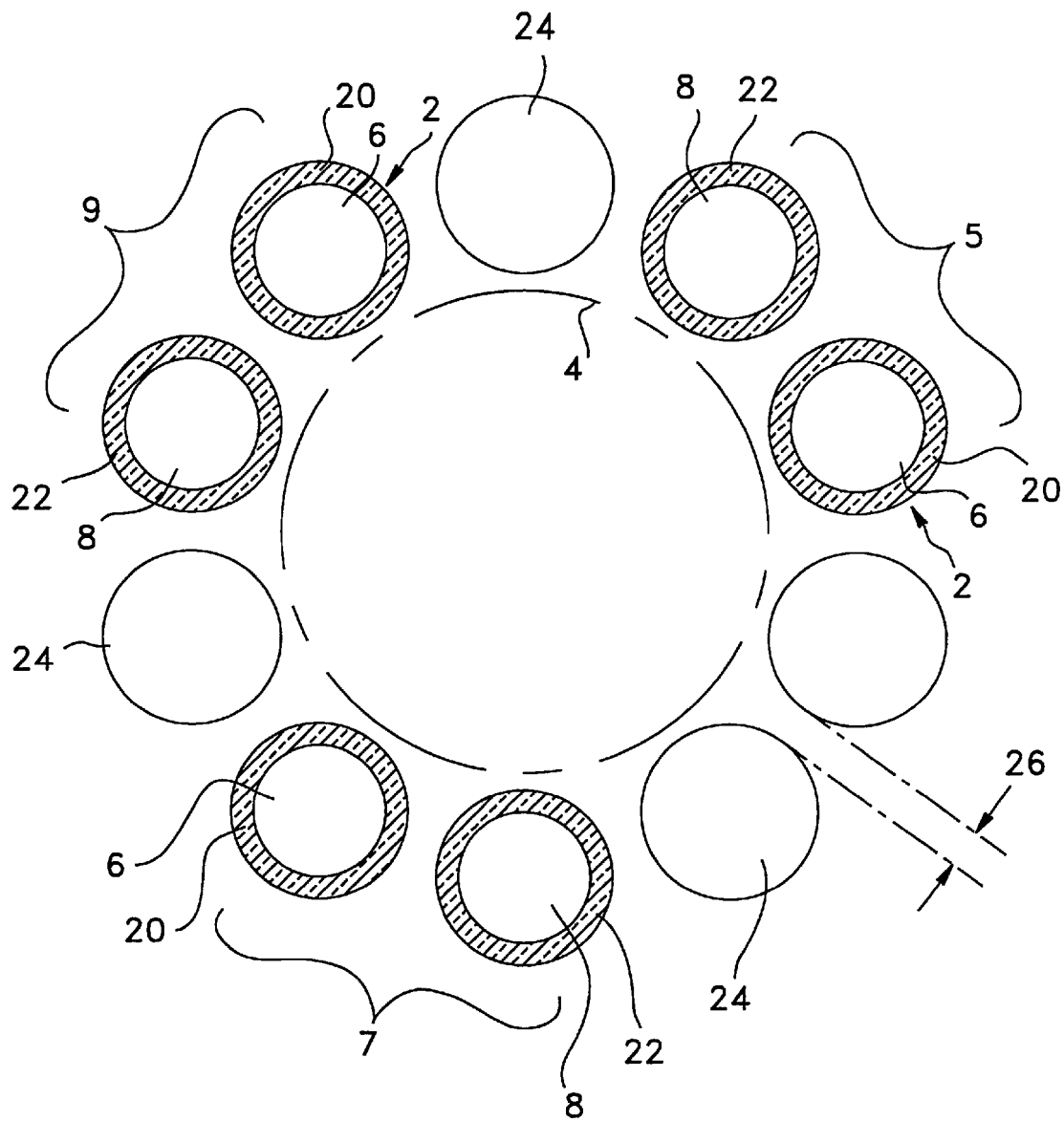
FIG. 4 is a cross-section view of the de-icing device taken along the lines 4—4 of the FIG. 3.

Referring to FIGS. 3 and 4, the de-icing device according to the invention is used to de-ice an elongated structural element 4 (in dashed lines in the figures) having a closed contour. In its basic configuration, the device has at least one pair of electrically conductive wires 6, 8 preformed in order to wind, one next to the other, along and around the structural element 4 following a generally helicoidal trajectory while embracing the contour of the structural element 4 with a predetermined gap between the conductive wires 6, 8 and the structural element 4. In FIGS. 3 and 4, the device has three pairs 5, 7, 9 of conductive wires 6, 8, as best shown in FIG. 4. The conductive wires 6, 8 have first ends 10, 12 for receiving electromagnetic impulses, and second ends 14, 16 opposite to the first ends 10, 12. The conductive wires 6, 8 are sized to withstand a current causing, between the conductive wires 6, 8 of each pair, a repulsion having an intensity capable of breaking the ice or the frost on the structural element 4 by a separation of the conductive wires 6, 8 from each other in response to the repulsion. The conductive wires 6, 8 have rigidity and elasticity properties such that the conductive wires 6, 8 recover their shape around the structural element 4 after the separation caused by the repulsion. The de-icing device has a compression joint 18 for electrically connecting the second ends 14, 16 of the conductive wires 6, 8 of the pair together. A welded joint may also be entirely suitable, like any other kind of connector suitable for this purpose. The de-icing device also has jackets 20, 22 made of an insulating material covering the conductive wires 6, 8 respectively, for electrically insulating them from each other and from the structural element 4.

Optionally or depending on the application and the configuration of the de-icing device, the spaces complementary to the spaces taken up by the pairs of wires 6, 8 on the contour of the structural element 4 can be filled by means of preformed wires 24 identical or similar to the conductive wires 6, 8, laid-out in parallel with the latter to form a twisted jacket around the structural element 4. Any other filling means suitable for this purpose can of course be used instead of the preformed wires 24.

To de-ice the elongated closed contour structural element 4, each pair of conductive wires 6, 8 is positioned along the structural element 4, in such a way that they coil-up one next to the other, along and around the structural element 4 following a generally helicoidal trajectory while embracing the contour of the structural element 4, leaving a predetermined gap between the conductive wires 6, 8 and the structural element 4. Then, the second ends 14, 16 of the conductive wires 6, 8 are simply electrically connected together, and electromagnetic impulses are applied between the first ends 10, 12 of the conductive wires 6, 8 to generate the desired current in the conductive wires 6, 8.

In order to obtain a jacket having a de-icing capacity, it is necessary to use elements exhibiting a sufficiently high mechanical resistance, on one hand so they may break the ice without permanently deforming, and on the other hand so they may embrace the surface to be protected as perfectly as possible. To simultaneously satisfy both these conditions, the invention relies upon the technology developed for manufacturing preformed wires, which is modified in order to adapt it to the de-icing by electromagnetic impulsions. To date, the preformed wires are used for the manufacturing of friction fasteners, their length presently not exceeding 3 to 4 meters. The invention requires to increase this length to a few hundreds of meters, which constitutes an apparently uncommon application of preformed wires of a length of 300 to 400 meters.

The de-icing device according to the invention operates by the application of electromagnetic impulses for the de-icing of any closed contour surface of a structural element, conductor or insulator, having sections that are cylindrical, tubular, rectangular, square, etc.

The device according to the invention forms, so to speak, an anti-frost jacket or a covering de-iceable by electromagnetic impulses made of preformed wires 6, 8, 24 embracing the external surface of the structural element 4 that it must protect. The intrinsic rigidity of the preformed wires 6, 8, 24 in the assembly and the particular layout of the preformed insulated conductive wires 6, 8 by pairs (e.g. 5, 7, 9 in FIG. 4), acts in such a way that the device constitutes a de-iceable unit totally independent as such from the structural element 4 around which it must be positioned.

The capability of embracing the surface covered by the jacket comes from the prior shaping of the wires 6, 8, 24 that must preferably be preformed so as to be adaptable to the exact dimensions of the structural element 4 as well as to the particular shape of its surface. Thus, any closed surface of a structural element can be covered with such a rigid, de-iceable jacket made of wires 6, 8, 24 preformed to its particular shape. The technique used for the preforming is that which is considered the most appropriate, in view of the material chosen for the wires 6, 8, 24. The material of the wires 6, 8, 24 must be sufficiently elastic and rigid so as to keep its proper shape after its installation on the structural element 4 and during the activation of the de-icing system. It is not necessary that the wires 6, 8, 24 be all of the same material.

The de-icing capability of the device according to the invention comes from the preformed conductive wires 6, 8 that are integrated by pairs in the anti-frost jacket. These wires 6, 8 must be electrically insulated from the other conductive wires and from the structural element 4 in order to transmit the current impulse required for the de-icing operation. In each pair, the insulated wires 6, 8 are disposed so as to be next to each other and such that the direction of the current in one is opposite to the current flowing in the other. In this way, the current flowing during the activation of the impulse source (not illustrated) will produce between the two adjacent wires 6, 8 a repulsive electric force proportional to the square of the current and inversely proportional their spacing. Thus, by passing a very high current impulse (e.g. 8000 A) between two parallel wires 6, 8 of the device, there is produced during a fraction of a second a very large repulsive force between the two wires 6, 8. To limit the power of the impulse source, the de-icing can be achieved in a sequenced manner, i.e. by sending the impulses not in all the pairs 5, 7, 9 simultaneously, but successively in one after the other. Any appropriate impulse source can be used. The wires 28, 30 of the impulse source can be connected to the conductive wires 6, 8 of the device through compression joints 32 or welded joints (not illustrated) or any other type of appropriate connectors.

The anti-frost jacket is assembled on the structural element 4 to be de-iced by leaving a certain gap 26 between the wires 6, 8, 24, as illustrated in FIG. 4. It is this gap 26 which allows the separation of the wires 6, 8 under the effect of the current impulses, that then hit the other wires 6, 8, 24 that are parallel to them. This sudden motion allows for the breaking of the ice layer on the anti-frost jacket surface. Furthermore, the particular shape imposed to the wires 6, 8, 24 during the preforming process allows to achieve an anti-frost jacket having a high mechanical rigidity that, during the injection of the current impulses, can only move in certain cases toward the outside, and thus efficiently break the ice. At the end of each impulse, the wires 6, 8, 24 recover their initial position due to the very high elasticity of the alloy used.

The de-icing device according to the invention allows the application of the electromagnetic impulse method for the de-icing of any tubular surface, be it conductive or insulated.

Figure 5:
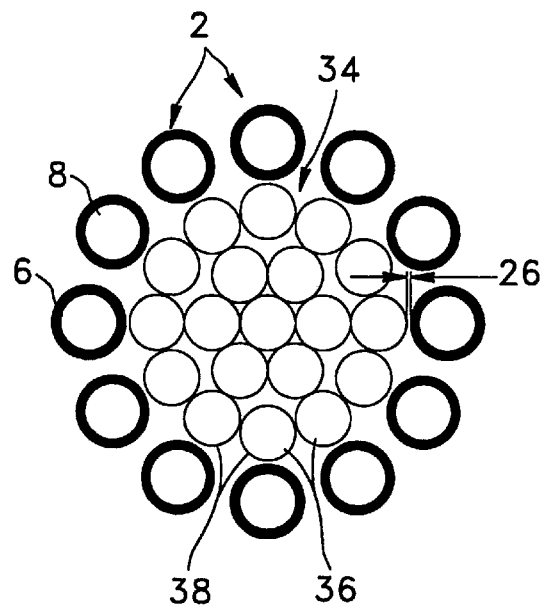
FIGS. 5 and 6 are transversal cross-section views showing the de-icing device according to the invention, mounted on two structural elements of different natures.

Referring to FIG. 5, there is shown a cross-section of a cylindrical rod 34 covered by an anti-frost jacket according to the invention, made-up of insulated conductive wires 6, 8 preformed beforehand in a sinusoidal spiral corresponding to the diameter of the rod 34 to which 1 mm is added to provide a gap 26 between the rod 34 and the anti-frost jacket. Thus, the anti-frost jacket is not solid with the rod 34 and cannot be subjected to the mechanical stress sustained by the rod 34 in the assembly. The same anti-frost jacket can be applied to any cylindrical element, for example an already existing cable and stay. The example shown in FIG. 5 is that of a steel stay having a 34 mm diameter and whose jacket is formed of aluminum wires 36 (e.g. alloy of grade 6021 T 83 ) having a 4.6 mm diameter and covered with 1 mm of insulating material 38. The pitch of the preformed wire 6, 8 is approximately 10 times the value of the stay diameter.

Figure 6:
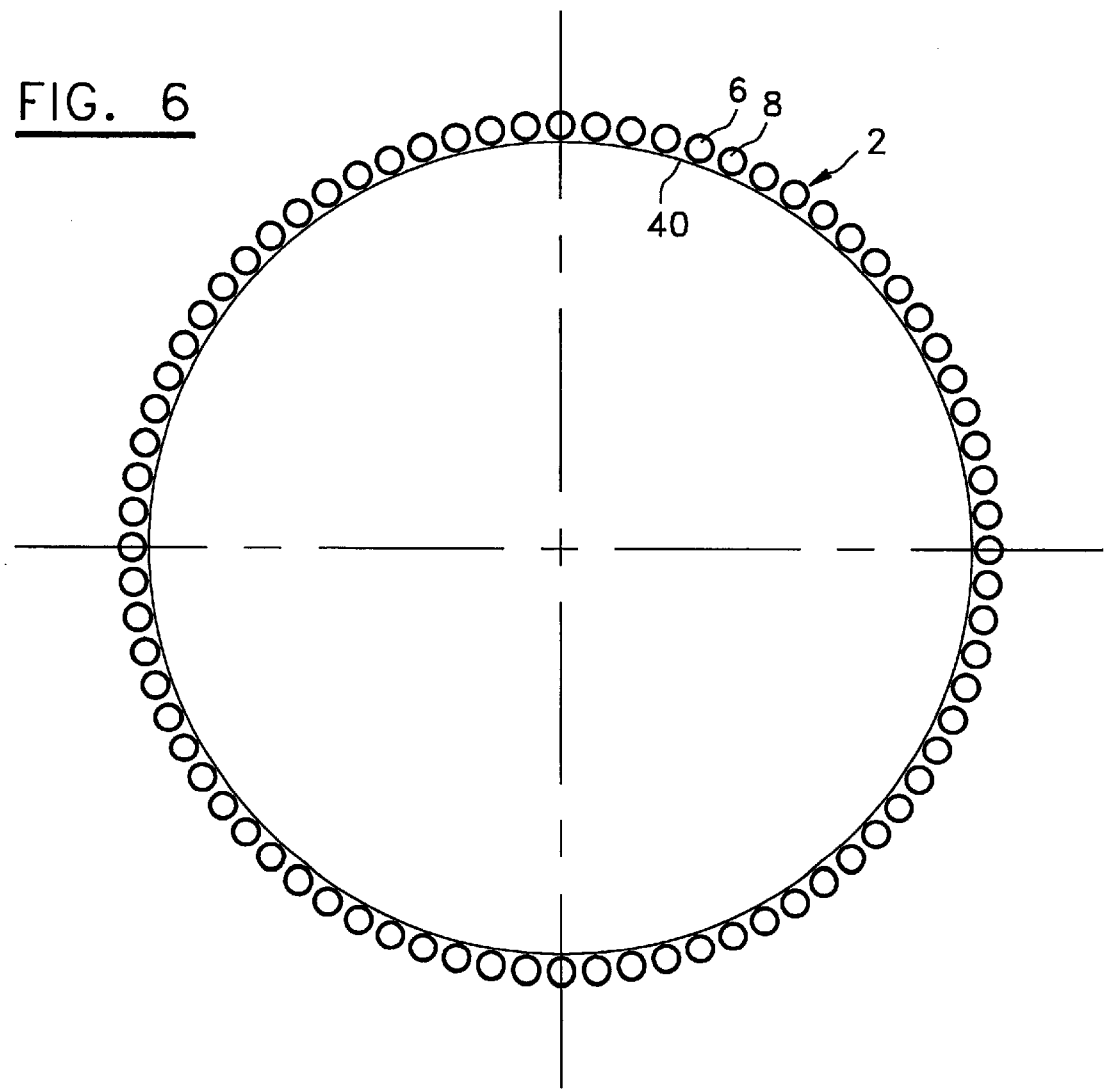

Referring to FIG. 6, there is shown an anti-frost jacket positioned on a large tube 40. With an appropriate manufacturing of the wires 6, 8 preformed in order to embrace the cylindrical contour, it is possible to de-ice tubes of large diameters over great lengths.

Figure 7:
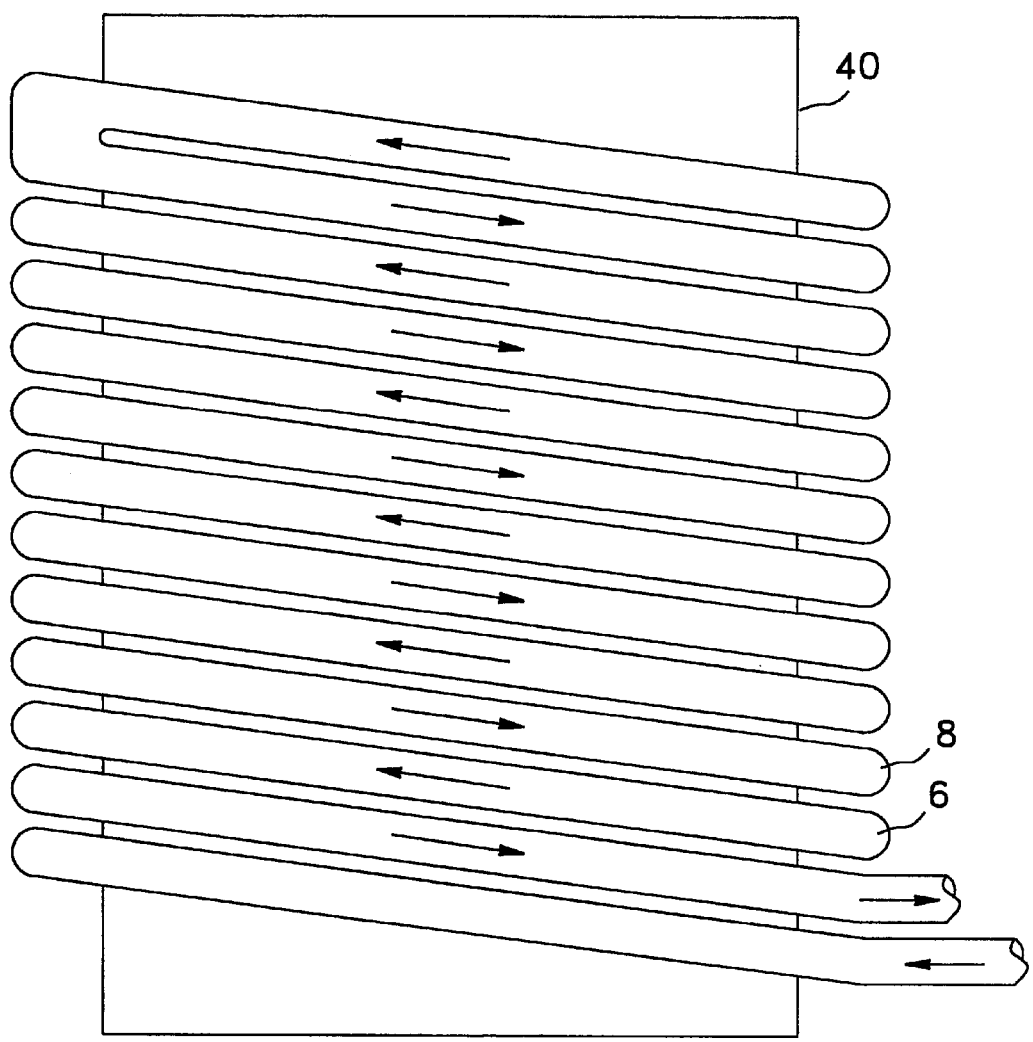
FIG. 7 is a side elevation view showing a de-icing device according to the invention, mounted on a short cylindrical element.

Referring to FIG. 7, there is shown a toroidal anti-frost jacket made of wires 6, 8 wound with a very small pitch. Such an arrangement is perfect for a large tube 40 having a small length. In this embodiment, the insulated conductive wires 6, 8 will, during the current discharge, move longitudinally to break the ice.

A conductive aluminum alloy having a high mechanical resistance (for example, the grade 6021 T 83 ) suits quite well to the manufacturing of insulated preformed conductive wires 6, 8 used for the de-icing. For their covering, an insulating material 20, 22 preferably a plastic having a high mechanical resistance (for example, reticulated polyethylene or its equivalent) can be used in order to be capable to preform the aluminum wires 6, 8 after their coating with the insulator 20, 22. Finally, the dimensions of the insulated conductive wires 6, 8 are chosen according to the alloy used, so as to maximize the current impulse to break the ice without causing permanent deformation at the level of the wires 6, 8, under the temperature conditions likely to be met.

For the preformed wires 24 other than those used for de-icing the anti-frost jacket, any material, conductive metallic alloy or insulating plastic can be used as need be. As for the insulated conductive wires 6, 8, the only condition to be satisfied is that the selected material be sufficiently rigid to break the ice and sufficiently elastic to preserve the integrity of its shape after the installation over the structural element 4 and during the de-icing operation.

The electromagnetic impulse source used to generate the de-icing currents in the conductive wires 6, 8 can be made of several units (not illustrated) of capacitors arranged in a battery configuration, that are charged to the voltage required to obtain an impulse of 1 to 3 milliseconds with a current peak of 6–8 kA in the pairs of insulated conductive wires 6, 8 used for the de-icing. The discharge of the capacitors can be controlled by means of a thyristor based circuit (not illustrated).

An ice detecting device (not illustrated) can be integrated to the de-icing device to automatically activate the impulse source in order to break a given thickness of ice, for example, 1 or 2 mm. Under the action of the high current impulse, the wires 6, 8 then suddenly move away from each other, resulting in the breaking of the layer of ice on the surface of the anti-frost jacket in very small pieces, which are then thrown out all around.

Changes and modifications to the above described embodiments can be made without departing from the scope or essence of the invention. The scope of the invention is considered to be defined only by the scope of the appended claims.

What is claimed is:

1. A device for de-icing an elongated structural element having a closed contour, comprising:

at least one pair of electrically conductive wires preformed for winding, one next to the other, along and around the structural element following a substantially helicoidal trajectory while embracing substantially the contour of the structural element with a predetermined gap between the conductive wires and the structural element, the conductive wires having first ends for receiving electromagnetic impulses, and second ends opposite to the first ends, the conductive wires being sized to withstand a current causing, between the conductive wires of the pair, a repulsion having an intensity capable to break the ice or the frost on the structural element by a separation of the conductive wires from each other in response to the repulsion, the conductive wires having rigidity and elasticity properties such that the conductive wires recover their shape around the structural element after the separation caused by the repulsion;

means for electrically connecting the second ends of the conductive wires of the pair together; and means for electrically insulating the conductive wires of the pair from each other and from the structural element.

2. A device according to claim 1, comprising means for filling a space complementary to the space occupied by said at least one pair of wires on the contour of the structural element.

3. A device according to claim 2, wherein the means for filling comprise preformed wires substantially identical to the conductive wires, fitting in parallel with the conductive wires to form a stranded jacket around the structural element.

4. A device according to claim 1, wherein the means for insulating comprise jackets made of insulating material covering the conductive wires respectively.

5. A device according to claim 1, wherein the means for connecting comprise a compression joint or a welded joint.

6. A device according to claim 1, wherein the gap is of about 1 mm.

7. A device according to claim 1, wherein the conductive wires have a length reaching up to about 400 meters.

8. A device according to claim 1, wherein the current has an intensity of about 6 to 8 kA.

9. A device according to claim 1, wherein the structural element is a cable or a stay.

10. A device according to claim 1, wherein the structural element has a predetermined diameter, and the conductive wires have a pitch of about 10 times the diameter of the structural element.

11. A device according to claim 1, wherein the conductive wires have a predetermined diameter, and have a pitch corresponding substantially to two times said diameter.

12. A device according to claim 1, wherein the conductive wires comprise a conductive aluminum alloy, and the means for insulating are jackets made of plastic covering the conductive wires respectively.

13. A method for de-icing an elongated structural element having a closed contour, comprising the steps of:

positioning at least one pair of conductive wires along the structural element, the conductive wires being preformed to wind, one next to the other, along and around the structural element following a substantially helicoidal trajectory while embracing substantially the contour of the structural element with a predetermined gap between the conductive wires and the structural element, the conductive wires having first and second opposite ends, the conductive wires being provided with means for electrically insulating the conductive wires from each other and from the structural element, the conductive wires being sized to withstand a current causing, between the conductive wires of the pair, a repulsion having an intensity capable of breaking the ice or the frost on the structural element by a separation of the conductive wires from each other in response to the repulsion, the conductive wires having rigidity and elasticity properties such that the conductive wires recover their shape around the structural element after the separation caused by the repulsion;

electrically connecting the second ends of the conductive wires together; and applying electromagnetic impulses between the first ends of the conductive wires to generate said current in the conductive wires.

14. A method according to claim 13, comprising the additional step of positioning preformed wires substantially identical to the conductive wires, by laying them in parallel with the conductive wires to form a stranded jacket around the structural element.

15. A method according to claim 13, wherein said at least one pair comprises several pairs of conductive wires, and the step of applying electromagnetic impulses is carried-out in a sequential manner on each of the pairs of conductive wires.

16. A method according to claim 13, wherein the electromagnetic impulses are applied during about 1 to 3 ms with a current peak of about 6 to 8 kA in the conductive wires.

17. A method according to claim 13, wherein the step of connecting comprises a connection of the second ends by means of a compression joint or a welded joint.

* * * * *